L. SCHÖN.
ARRANGEMENT FOR EXCITING CONTINUOUS CURRENT GENERATORS.
APPLICATION FILED SEPT. 4, 1920.
1,420,761.
Patented June 27, 1922.
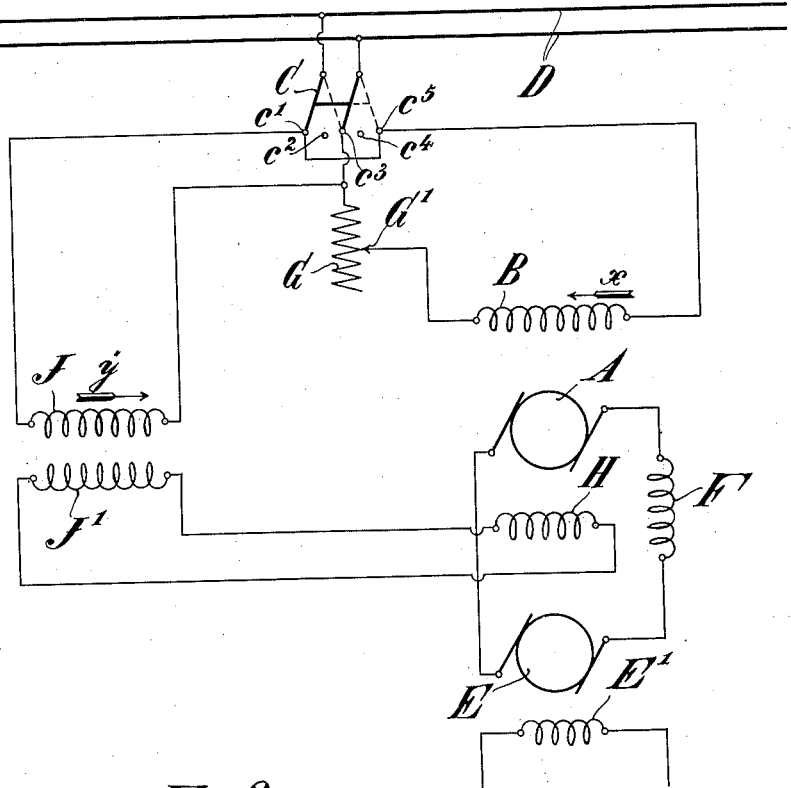
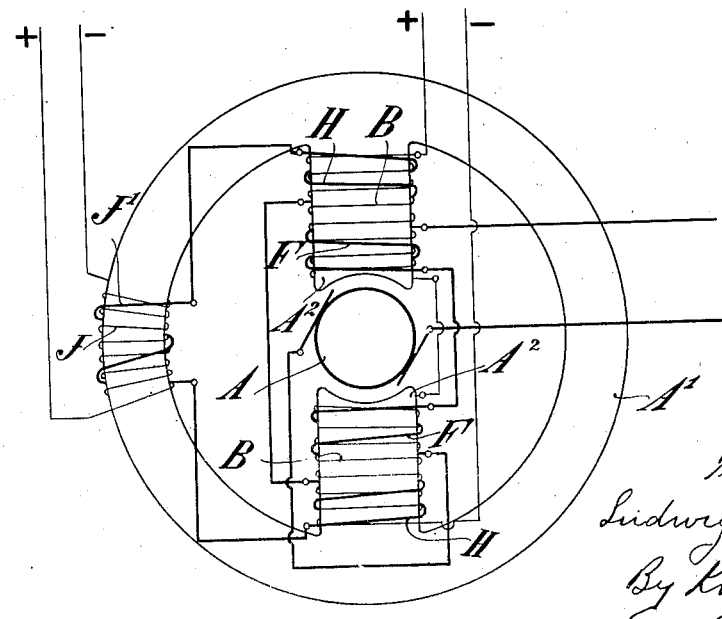

UNITED STATES PATENT OFFICE.

LUDWIG SCHÖN, OF ESSEN, GERMANY, ASSIGNOR TO FRIED. KRUPP AKTIEN-GESELLSCHAFT, OF ESSEN-ON-THE-RUHR, GERMANY.

ARRANGEMENT FOR EXCITING CONTINUOUS CURRENT GENERATORS.

1,420,761.    Specification of Letters Patent.    Patented June 27, 1922.

Application filed September 4, 1920. Serial No. 408,381.

*To all whom it may concern:*

Be it known that I, Dr. LUDWIG SCHÖN, residing at Essen, Germany, a citizen of the German Republic, have invented a certain new and useful Improvement in Arrangements for Exciting Continuous-Current Generators (for which I have filed applications in Germany, Jan. 6, 1915; Austria, Sept. 13, 1918; Hungary, Oct. 9, 1918; Sweden, May 15, 1920; Switzerland, May 12, 1920; Czecho-Slovakia, May 3, 1920), of which the following is a specification.

This invention relates to arrangements for exciting continuous current generators having an exciting winding supplied from a source of separate excitation and a winding traversed by the armature current or a portion thereof and connected by a Leonard connection to a motor.

If in such arrangement the requirement is to be fulfilled that the number of revolutions of the motor shall remain constant under all loads and furthermore shall be adjustable within wide limits in a finely graduated manner, the exciting winding of the generator which is traversed by the armature current must be of such dimensions that the magnetic field produced by it is sufficient to produce an electromotive force which is capable of covering the internal ohmic drops of the armature circuit.

Now if the motor in which the said condition is fulfilled is to start with a very small speed and yield a large turning moment, the counter electromotive force of the motor, the magnitude of which is determined by the separate excitation of the generator, falls almost completely behind the electromotive force induced by the armature current in the generator and this latter then behaves in a manner similar to a main current generator.

In an arrangement of this kind however the speed of the motor remains constant under all loads, if for the generator the ratio of the armature tension to the armature current $\left(\frac{ea}{ia}\right)$ under all loads is constant and equal to the sum of the ohmic resistance ($\xi\omega$) in the armature circuit. On the other hand however, as is well known, a main current generator excites itself under otherwise equal circumstances, more slowly, and may therefore be said to have a time constant (T) which is greater, the smaller the difference between the magnitudes $\frac{ea}{ia}$ and $\xi\omega$. This relationship is shown by the equation $$T = \frac{L}{\frac{ea}{ia} - \xi\omega}$$

in which the value L not before mentioned denotes the self induction coefficient of the armature circuit. When $\frac{ea}{ia}$ and $\xi\omega$ are equal $T = \infty$ that is to say, no self excitation takes place at all.

Now the object of the present invention is to provide in such continuous current generators, an arrangement by means of which, even in such cases where with a small speed and high load of the motor, a constant number of rotations of the motor is demanded, a very rapid and sure excitation of the generator can be attained.

The invention will now be described with reference to the accompanying drawing in which Figure 1 is a diagram showing the connections of the arrangement and Figure 2 is a diagrammatic representation of a continuous current generator with the different windings arranged according to the invention.

In Figure 1, A denotes the armature and B the separately excited field winding of a continuous current generator, which can be connected by means of a two-pole reversing switch C to a source of continuous current D. The continuous current generator, which is connected by means of the known Leonard connection, directly to the armature E of a motor which is separately excited by means of a field winding $E^1$ and is reversible, has also an additional winding F traversed by the armature current.

In order to enable the number of revolutions of the motor E, $E^1$ to be regulated in a finely graduated way, the field winding B of the generator has placed in its circuit, in the well know way, a regulating resistance G.

The continuous current generator contains also an auxiliary exciting winding H. This auxiliary exciting winding H is connected with the secondary $J^1$ of a transformer the primary J of which can likewise be connected up through the two pole reversing switch C to the source of separate excitation D. The reversing switch C is provided for this purpose with contacts $c^1$, $c^2$, $c^3$, $c^4$ and $c^5$, which are so arranged, that the bars of the reversing switch C, come in contact with two of the said contacts simultaneously. Two, $c^2$ and $c^4$, of these contacts are blind contacts, while the other, $c^1$ and $c^2$ and $c^3$ and $c^5$ are intended to connect the field winding B and the regulating resistance G in series therewith and the primary J of the transformer, in such a way, with the source of separate excitation, that when switched on they receive current together in one direction and when reversed the direction of the current in the field winding B and the primary of the transformer is reversed simultaneously.

For this purpose the arrangement is so contrived that the contacts $c^1$ and $c^5$ are connected together and to one end of the windings B and J while the contact $c^3$ is connected to the regulating resistance G and the other end of the winding J, the sliding contact of the regulating resistance being connected to the other end of the field winding B. The transformer primary winding J is connected therefore, in each of the closed positions of the reversing switch C in parallel with the circuit containing the field winding B and the regulating resistance G.

The direction of winding of the auxiliary exciting winding H is so chosen that on the increase of the current in the windings B and J, the magnetic fields produced by the field windings B and H, are added together.

If when the above described arrangement is being used the reversing switch C is in contact with the contacts $c^2$, $c^4$ no current flows in the exciting windings B, F and H of the generator and the motor armature E remains stationary. If now the reversing switch C be brought over into the illustrated position in which it is in contact with the contacts $c^1$, $c^3$, current flows from the source of separate excitation D through the contact $c^1$ the primary winding J of the transformer and from this latter through the contact $c^5$ back to D while at the same time a current flows from the source of separate excitation D through the contact $c^1$ to the exciting winding B of the generator and also through the regulating resistance $G^1$, G and contact $c^3$ back to D, the current passing through the windings B and J at the same time in the direction of the arrows $x$ and $y$ (see Figure 1). There is therefore produced in the primary winding J, a current impulse, which is transmitted to the circuit containing the secondary winding $J^1$, by induction, so that the auxiliary exciting winding H is also traversed by a rapidly increasing current of short duration. This current which flows through the auxiliary exciting winding H produces if all the parts in the magnet frame of the generator be suitably proportioned a magnetic field which augments the field produced by the field winding B that a current of such a strength is produced in the armature circuit that the motor armature E starts rapidly even under the greatest load. Its speed at the same time assumes a value which is determined by the position of the sliding contact of the regulating resistance G. As soon as the current in the primary J of the transformer has attained its full strength, the secondary $J^1$ and with it also the auxiliary exciting winding H becomes devoid of current.

In the meantime however the magnetic field produced by the additional winding F has attained a strength that notwithstanding the disappearance of the current in the winding H, a sufficiently strong field remains in the generator, whereby any falling off of current strength in the circuit A, F, E and any stoppage of the motor armature E is prevented with certainty.

If the reversing switch C be brought into the cut-out position $c^2$, $c^4$ the current disappears in the primary J of the transformer and in the field winding B very rapidly. According to the known laws of induction the current will now flow in the circuit $J^1$, H in the opposite direction to that in which it did on the switching on of the reversing switch C and the auxiliary exciting winding H will act against the separately excited winding B and the additional winding F and the current strength in the armature circuit A, F, E drops correspondingly quickly, so that the motor armature E very quickly becomes stationary.

It is obvious therefore that exactly the same operations only in the reverse direction must take place in all the circuits when the reversing switch C is brought into the dotted position $c^3$, $c^5$, the difference being that the armature E of the motor will now run in the opposite direction.

The transformer J, $J^1$ can be combined with the continuous current generator A, B, F, H, in a very simple way if, as in Figure 2, the yoke $A^1$ of the magnet frame, on the poles $A^2$ of which, the exciting windings B, F and H are placed be used directly as an iron core for the transformer and the windings J and $J^1$ wound thereon.

Without in any manner departing from the spirit of the invention the transformer J J' with respect to the magnet frame A' need not be necessarily limited to the precise manner of installation indicated in Fig. 2. Other and advantageous possibilities will occur to those skilled in the art.

It should be pointed out that the use of a transformer in the exciting circuit of a continuous current dynamo machine is already known per se. In the known arrangements however the primary coil of the transformer is placed permanently in the armature circuit of the dynamo. It is not possible however with these arrangements to decrease the time of excitation when starting up the dynamo but on the contrary they are intended for producing an automatic regulation of the tension during working.

I claim.

1. Arrangement for exciting a continuous current dynamo having a main field winding and a separate source of excitation therefor, an auxiliary field winding energized by the current generated in the dynamo, and a second auxiliary field winding, a transformer, having its primary winding connected to said separate excitation source and controlled to receive current therefrom simultaneously with said main field winding, the secondary transformer winding being in circuit with said second auxiliary field winding.

2. Arrangement for exciting a continuous current dynamo having a main field winding, and a separate source of excitation therefor, an auxiliary field winding energized by the current generated in the dynamo, and a second auxiliary field winding, a transformer, having its primary winding connected to said separate excitation source and controlled to receive current therefrom simultaneously with said main field winding, the secondary transformer winding being in circuit with said second auxiliary field winding and being connected thereto with such polarity that the current, induced in said second auxiliary field winding when the source of excitation is connected to said main field winding, produces a field in support of the field produced by said field main winding.

3. Arrangement for exciting a continuous current dynamo having a main field winding and a separate source of excitation therefor, an auxiliary field winding energized by the current generated in the dynamo, and a second auxiliary field winding, a transformer, having its primary winding connected to said separate excitation source and controlled to receive current therefrom simultaneously with said main field winding, the secondary transformer winding being in circuit with said secondary auxiliary field winding said transformer having its two windings disposed on the dynamo frame.

4. Arrangement for exciting a continuous current dynamo having a main field winding and a separate source of excitation therefor, an auxiliary field winding energized by the current generated in the dynamo, and a second auxiliary field winding, a transformer, having its primary winding connected to said separate excitation source and controlled to receive current therefrom simultaneously with said main field winding, the secondary transformer winding being in circuit with said second auxiliary field winding and being connected thereto with such polarity that the current, induced in said second auxiliary field winding when the source of excitation is connected to said main field winding, produces a field in support of the field produced by said main field winding, said transformer having its two windings disposed on the dynamo frame.

5. In combination with a generator for the control of a motor, a source of electromotive force, a generator field winding and an auxiliary impulse field winding fed from said source, and means to vary the connection of said generator and auxiliary field windings with respect to said source.

6. In combination with a generator for the control of a motor, a series winding for said generator, a source of electromotive force, a generator field winding and an auxiliary impulse field winding fed from said source, and means to vary the connection of said generator and auxiliary field windings with respect to said source.

7. In combination with a generator for the control of a motor, a source of electromotive force, a generator field winding and an auxiliary impulse field winding fed from said source, and means to vary the connection of said generator and auxiliary field windings with respect to said source, said generator windings being inductively mounted on said generator.

8. In combination with a generator for the control of a motor, a series winding for said generator, a source of electromotive force, a generator field winding and an auxiliary impulse field winding fed from said source, and means to vary the connection of said generator and auxiliary field windings with respect to said source, said generator windings being inductively mounted on said generator.

The foregoing specification signed at Essen, Germany, this 27th day of May, 1920.

L. SCHÖN.

In presence of—
 HANS GOTTSMANN,
 JOSEF OEBERTZ.